US011108661B1

(12) United States Patent
Anchlia et al.

(10) Patent No.: US 11,108,661 B1
(45) Date of Patent: Aug. 31, 2021

(54) APPARATUS AND METHOD FOR PROCESSING STREAMING DATA AND FORMING VISUALIZATIONS THEREOF

(71) Applicant: Cloudera, Inc., Palo Alto, CA (US)

(72) Inventors: Charu Anchlia, San Mateo, CA (US); Sushil Thomas, San Francisco, CA (US)

(73) Assignee: Cloudera, Inc., Palo Alto, CA (US)

( * ) Notice: Subject to any disclaimer, the term of this patent is extended or adjusted under 35 U.S.C. 154(b) by 0 days.

(21) Appl. No.: 16/280,397

(22) Filed: Feb. 20, 2019

(51) Int. Cl.
*G06F 15/173* (2006.01)
*H04L 12/26* (2006.01)
*G06F 16/9538* (2019.01)
*H04L 29/06* (2006.01)
*H04L 12/24* (2006.01)

(52) U.S. Cl.
CPC ........ *H04L 43/045* (2013.01); *G06F 16/9538* (2019.01); *H04L 41/22* (2013.01); *H04L 65/4069* (2013.01)

(58) Field of Classification Search
CPC ... H04L 43/045; H04L 41/22; H04L 65/4069; G06F 16/9538
USPC ........................................................ 709/224
See application file for complete search history.

(56) References Cited

U.S. PATENT DOCUMENTS

| | | | |
|---|---|---|---|
| 10,250,662 B1* | 4/2019 | O'Connell | H04L 65/607 |
| 10,567,237 B1* | 2/2020 | Powell | H04L 41/14 |
| 2009/0287814 A1* | 11/2009 | Robertson | G06Q 10/10 |
| | | | 709/224 |
| 2019/0050463 A1* | 2/2019 | Goradia | G06T 11/206 |
| 2019/0258733 A1* | 8/2019 | Brown | G06F 16/24552 |
| 2020/0034406 A1* | 1/2020 | Abdelnur | G06F 17/18 |
| 2020/0364065 A1* | 11/2020 | Cohen | G06F 11/302 |

* cited by examiner

*Primary Examiner* — Wing F Chan
*Assistant Examiner* — Joseph R Maniwang
(74) *Attorney, Agent, or Firm* — Staniford Tomita LLP (57) ABSTRACT

A machine has a bus and a network interface circuit to receive different data streams from a network. The network interface circuit is connected to the network and the bus. A processor is connected to the bus. A memory is connected to the bus. The memory stores instructions executed by the processor to continuously increment aggregate functions associated with data parameters within the different data streams. Visualizations of the different data streams are periodically updated on different client devices connected to the network.

14 Claims, 7 Drawing Sheets

APPARATUS AND METHOD FOR PROCESSING STREAMING DATA AND FORMING VISUALIZATIONS THEREOF

FIELD OF THE INVENTION

This invention relates generally to communications in computer networks. More particularly, this invention is directed toward techniques for processing streaming data and forming visualizations thereof.

BACKGROUND OF THE INVENTION

Streaming data is a continuous sequence of data records, such as a social media stream, log file records, in-game player activity, financial data, geospatial information and telemetry information. Streaming data has turned the world of databases inside out. In the world of streaming data, there are no completely correct answers. There is only a correct answer 'right now' and this correct answer is constantly changing. Users and businesses need immediate answers.

Visualizing streaming data is also a challenge when the data to be queried is massive and waiting for the entire data set to be queried before displaying any results is not user friendly. Thus, there is a need to intelligently present incremental results of streamed data.

SUMMARY OF THE INVENTION

A machine has a bus and a network interface circuit to receive different data streams from a network. The network interface circuit is connected to the network and the bus. A processor is connected to the bus. A memory is connected to the bus. The memory stores instructions executed by the processor to continuously increment aggregate functions associated with data parameters within the different data streams. Visualizations of the different data streams are periodically updated on different client devices connected to the network.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
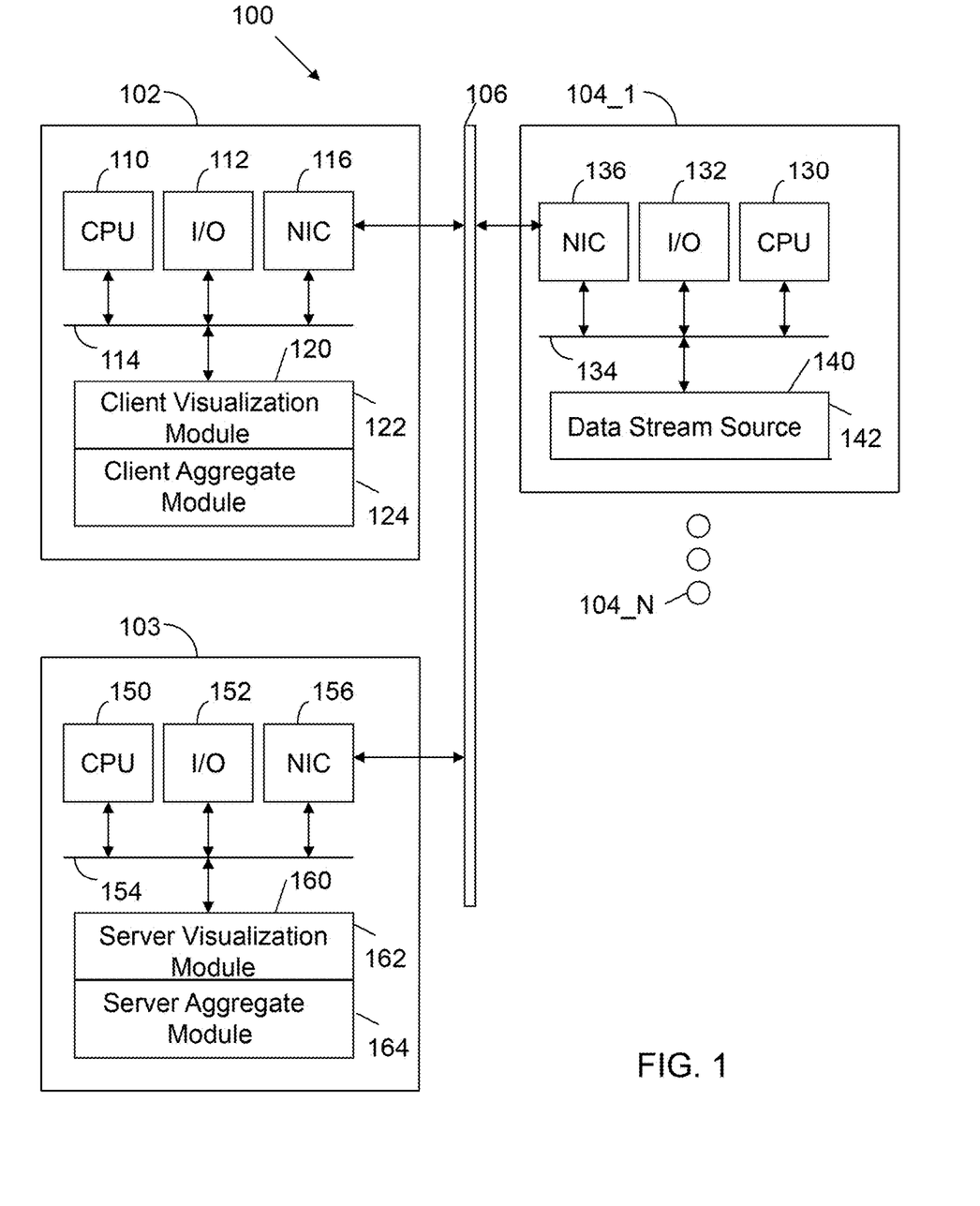
FIG. 1 illustrates a system configured in accordance with an embodiment of the invention.

FIG. 1 illustrates a system 100 configured in accordance with an embodiment of the invention. The system 100 includes a client machine 102 connected to a network 106, which may be any combination of wired and wireless networks. Also connected to the network 106 is a visualization server 103. Also connected to the network 106 are data streaming machines 104_1 through 104N. Visualization server 103 consumes data streams from one or more data streaming machines 104 and supplies the data streams to client machine 102, as discussed below.

Client machine 102 includes a processor (i.e., central processing unit 110) and input/output devices 112 connected via a bus 114. The input/output devices 112 may include a keyboard, mouse, touch display and the like. A network interface circuit 116 is also connected to the bus 114. The network interface circuit 116 provides connectivity to network 106.

A memory 120 is also connected to the bus 114. The memory 120 stores instructions executed by processor 110 to implement operations disclosed herein. In one embodiment, the memory 20 stores a client visualization module 122 with instructions executed by the processor 110 to periodically update a visualization of the data stream. An update transpires when a visualization stability threshold is reached. The visualization stability threshold defines an amount of the data stream to collect prior to updating the visualization of the data stream. Alternately, the visualization stability threshold may be defined as a temporal parameter (e.g, 2 seconds). Continuously updating a visualization of a data stream can produce visualizations that are confusing and/or aesthetically unpleasing. The visualization stability threshold mitigates these problems.

The visualization stability threshold value is tuned in accordance with the type of visualization that is being rendered. For example, near continuous updates to a data calendar heat map may not be distracting to a user since the updates either only change the intensity of the color of the heat map or the area within the heat map that is populated. On the other hand, a larger visualization stability threshold is desirable in the event of a visualization with bar charts or line charts since each change alters the size and shape of all bars or lines.

The memory 120 also stores a client aggregate module 124. The client aggregate module 124 continuously increments aggregate functions associated with data parameters within the data stream. Example aggregate functions include sum, count, minimum and maximum. The aggregate module includes instructions executed by processor 110 to combine aggregate function to compute statistical measures, such as average, standard deviation, variance and the like.

The client visualization module 122 includes instructions executed by the processor 110 to incorporate the aggregate functions and statistical measures in the visualization of the data stream.

Stream machine 104_1 includes a processor 130, input/output devices 132, a bus 134 and a network interface circuit 136. A memory 140 is also connected to the bus 134. The memory stores a data stream source 142. The data stream source 142 produces a continuous sequence of data records. Example data streams include a social media stream, log file records, in-game player activity, financial data, geospatial information and telemetry information.

Visualization server 103 includes a processor, input/output devices 152, bus 154 and network interface circuit 156. A memory 160 is connected to bus 154. The memory stores a server visualization module 162 and a server aggregate module 164. The visualization and aggregation operations disclosed herein may be implemented on the client 102, on the server 103 or some combination of the two machines.

Figure 2:
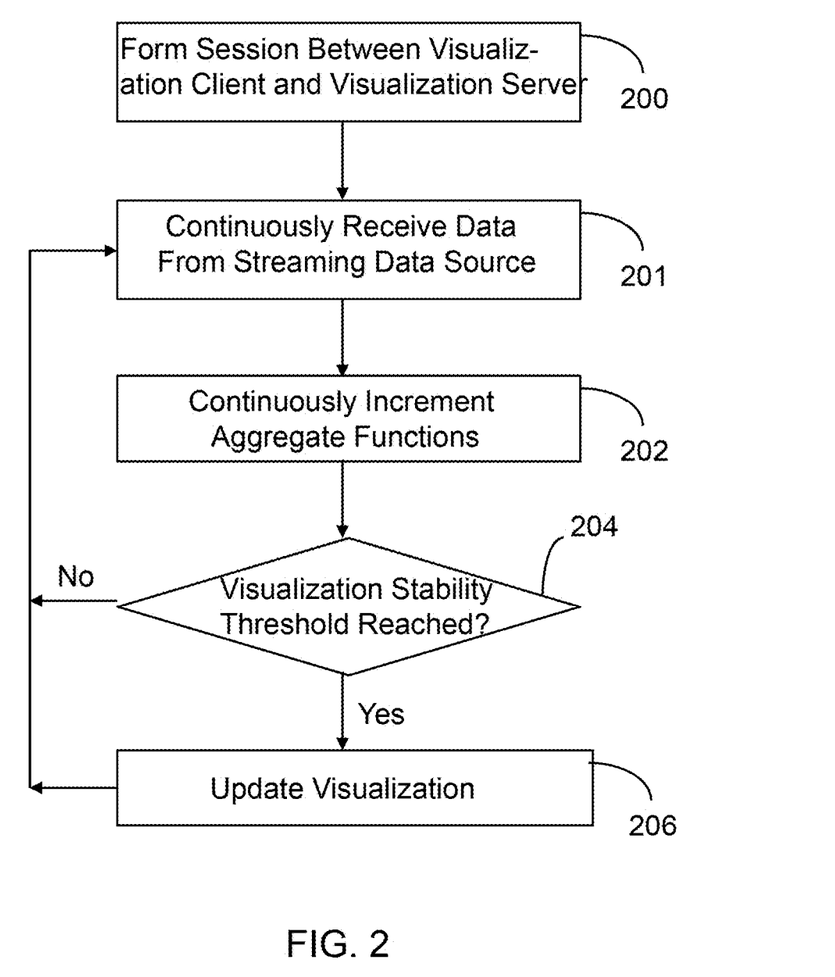
FIG. 2 illustrates processing operations associated with an embodiment of the invention.

FIG. 2 illustrates processing operations associated with an embodiment of the invention. A session is formed between the visualization client and the visualization server 200. The server visualization module 162 has a data connection component that manages the configuration parameters of the streaming source (e.g., one of sources 104_1 through 104N). It creates a thread pool to handle asynchronous requests to gather data from the streaming engine as well as to return data to a visualization client, as discussed in more detail below.

The server 103 continuously receives data from a streaming data source 201. The streamed data is routed to the client device 102. Before doing so, the server 103 performs at least initial aggregate and visualization operations. In one embodiment, aggregate functions are continuously incremented 202. This may be implemented with the server aggregate module 164 or a combination of the server aggregate module 164 and the client aggregate module 124.

A check is made to determine whether a visualization stability threshold is reached 204. If not (204—No), control returns to block 201. If so (204—Yes), the visualization is updated. The operations associated with blocks 204 and 206 may be implemented with the server visualization module 162 or a combination of the server visualization module 162 and the client visualization module 122.

Figure 3:
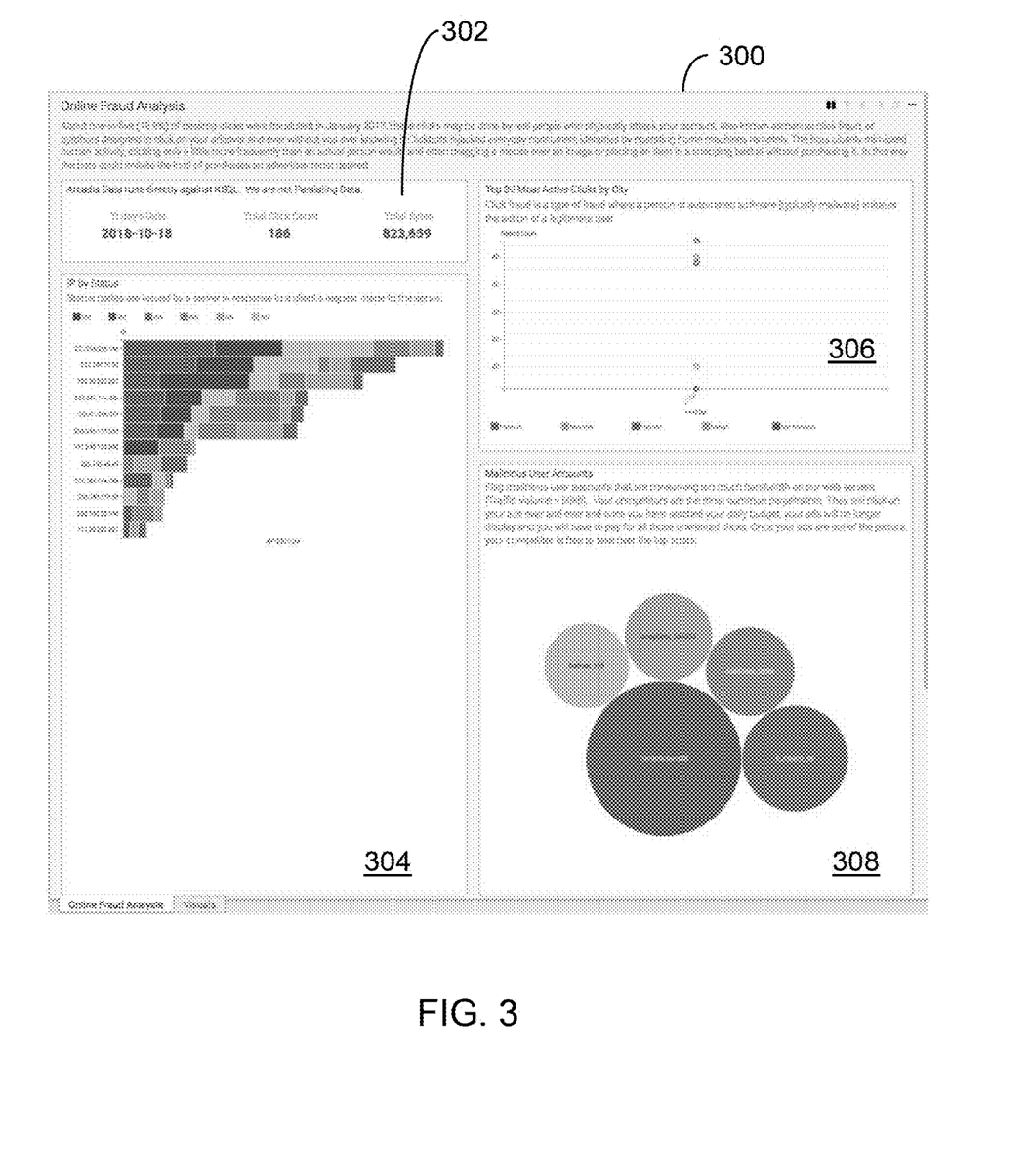
FIGS. 3-5 show incremental visualizations of streamed data.

FIG. 3 is an example of a visualization 300 of an initial amount of streamed data. In this example, the streamed data relates to online fraud analysis data. At this point in time 823,659 bytes of data have been streamed, as shown with lead line 302. The visualization 300 includes a bar chart area 304. The bar chart area 304 provides different server status codes for different IP addresses accessing the server. A graph region 306 displays click fraud activity by city. Region 308 depicts malicious user accounts. The size of any given circle is a measure of the malicious activity for the specified user account.

Figure 4:
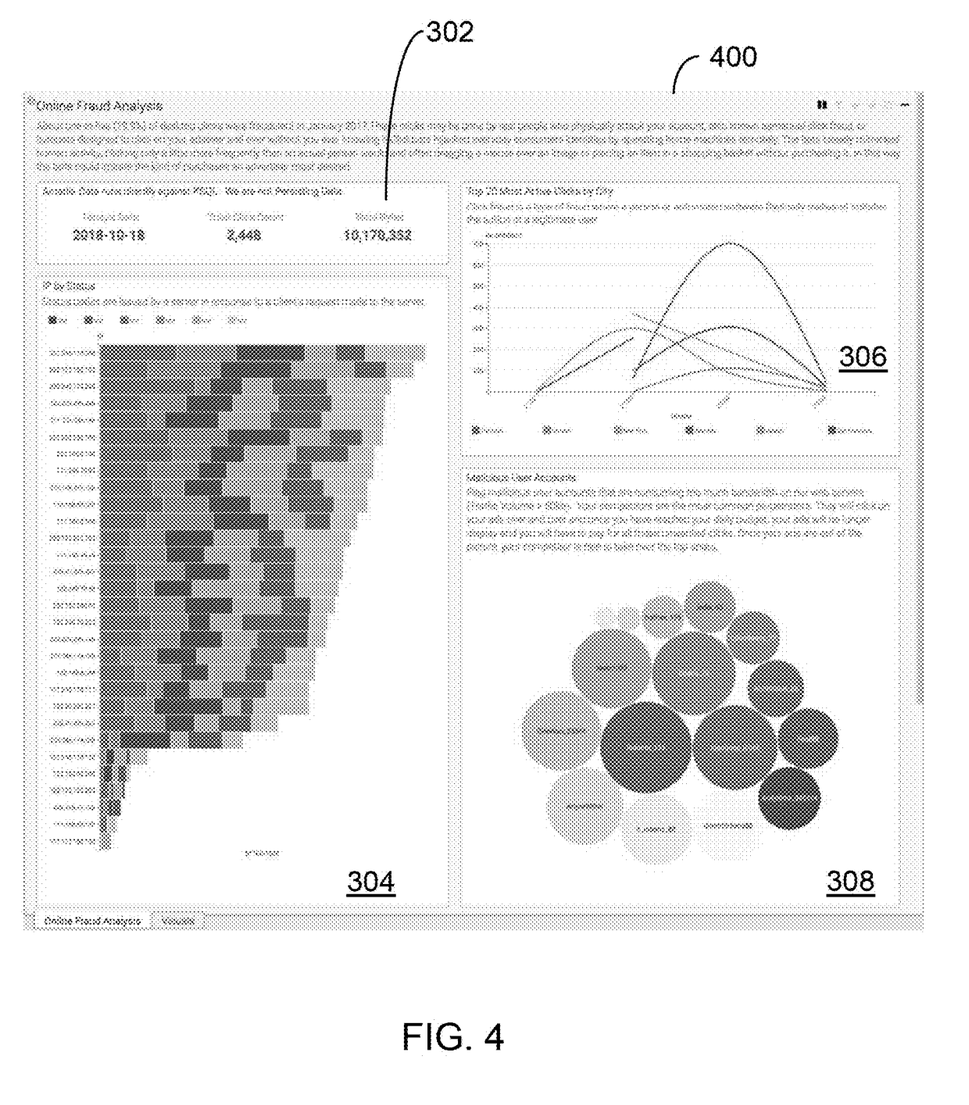

FIG. 4 illustrates an updated visualization 400 after approximately 10 million bytes have been received. The bar chart area 304 is significantly developed. The graph region 306 has intelligible information and region 308 has transitioned from a small number of large malicious accounts to a larger number of smaller malicious accounts.

Figure 5:
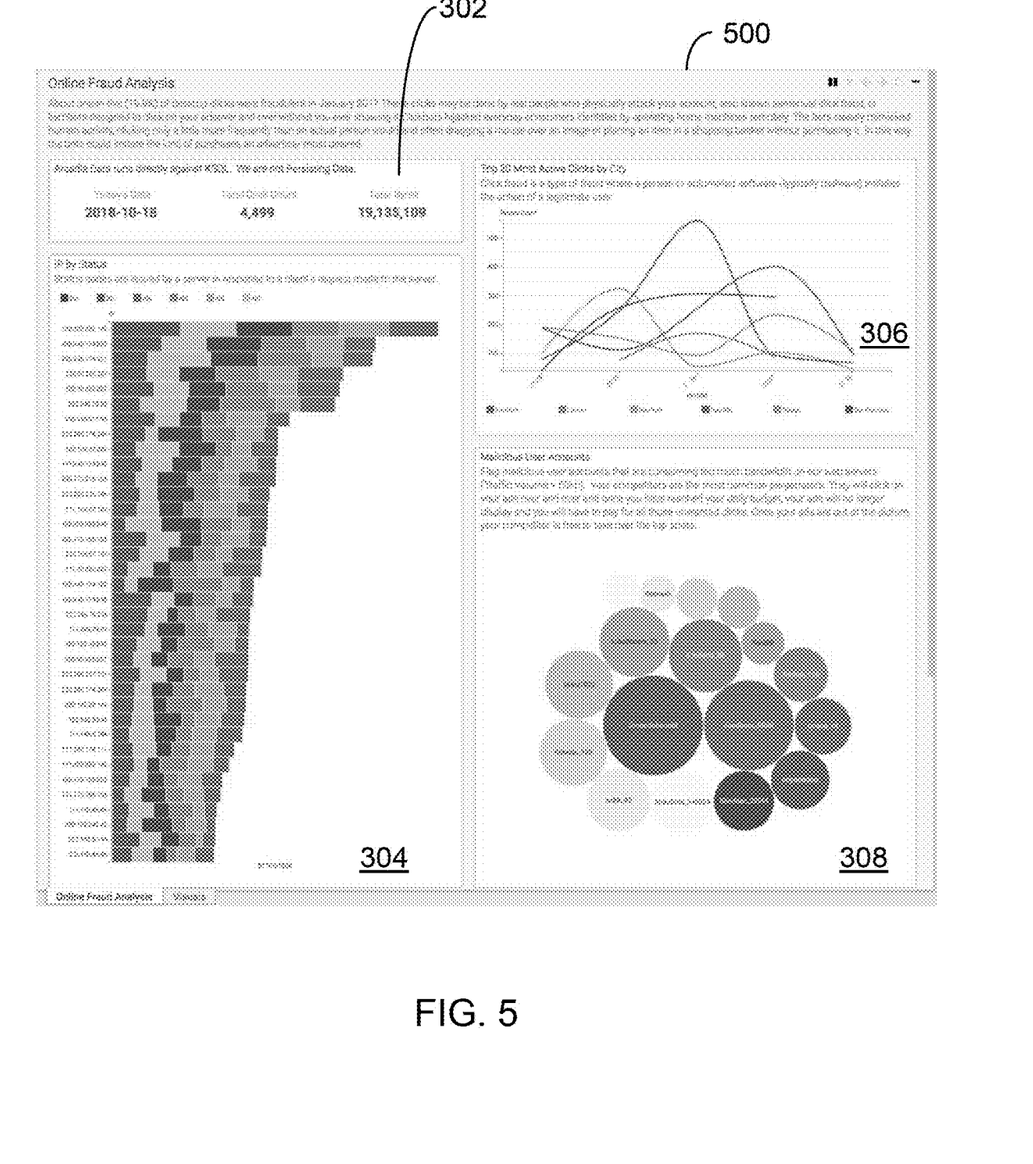

FIG. 5 illustrates an updated visualization 50 after approximately 20 million bytes have been received. The bar chart area 304 is fully formed along the vertical axis. The graph region 306 has comprehensive information and region 308 continues to evolve.

Figure 6:
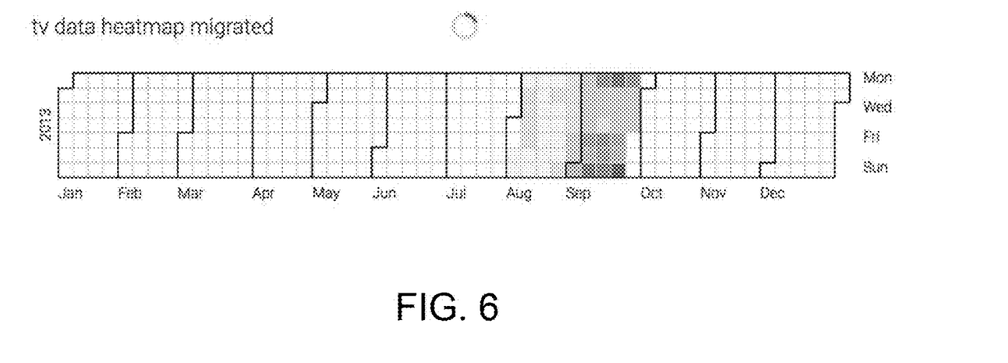
FIGS. 6-7 show data heat maps formed in accordance with embodiments of the invention.
Figure 7:
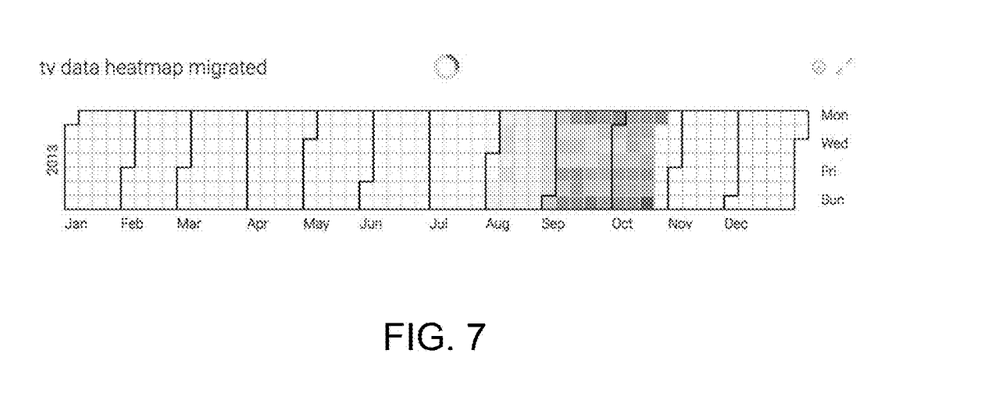

An example query could be related to TV channel viewing events, where the user wants to know which channel is being most watched. The data source could be massive and have data from each day stored. The streaming visualization would query a part of the data, say perhaps for one day and would show channel-watched-events for each channel for that day. After that, it would query for the previous day's information, use local aggregation to sum up the events for the two days and then display those results and then in a streaming continuous manner continue to display results, by getting more and more data and doing local aggregation. FIG. 6 illustrates a data heat map for this scenario. FIG. 7 illustrates an updated data heat map based upon additional data, as indicated by the progress bars shown at the top of each figure.

A caveat is that this implementation works only for additive aggregations like sum and count. It does not work for non-decomposable aggregations like average. In the sample query above, one cannot keep the average number of events across channels for one day and then merge it with the previous day's average to get the final result of average over two days. The way to implement this is through implementing partial and final results of aggregates. Partial results of parts of data for aggregates like sum and count are kept.

Then to get a final aggregation like average, the final aggregation result of sum is divided by the final aggregation result of count. This may be implemented by the client aggregate module 124, the server aggregate module 164 or some combination thereof.

Another issue is implementing sorting. Since data is constantly streaming and results are being updated, sorting cannot be done on the data source end (i.e., the visualization server 103). Sorted data being retrieved for a portion of data is not reflective of the whole data sorted together. Sorting has to be implemented after every part of data is retrieved, and done by the client visualization module 122 such that after the aggregations are re-calculated, the sorting is done on the visualization end with these aggregate results.

For example, a streaming query could show the top 10 users with maximum clicks. If the query is constantly getting results for every minute of data, then the top 10 users in that minute may not necessarily be the top 10 users with maximum clicks seen on the system so far. As such, the client visualization module 122 keeps track of every minute of data (the dimension is each minute) and stores the clicks for every minute (# of clicks is the aggregation) and then re-aggregates at the time of visualization based on what time period the user is looking at.

An embodiment of the invention differentiates between how data is displayed while a user is creating a visualization versus when the user is consuming a visualization. The basic problem is that a streaming, ever changing visual is confusing to the user while the user is in the process of creating it. As discussed above, an embodiment of the invention pauses the streaming updates to the visual in creation mode. The important aspect to be noted here is that only the visualization updates are paused, and not the data retrieval or aggregating operations, since if the data retrieval were to be paused or dropped, it would result in incorrect results.

An example is a query for the number of clicks per user and the visual is showing the users and their associated clicks. If the visual is paused during editing, and had the data collection from the backend paused, then when the visual was resumed, the counts per user would be incorrect since it would not count the clicks that happened while the visual was paused. Consequently, the client visualization module 122 always consumes data, even if the currently rendered visualization does not incorporate such data.

Figure 8:
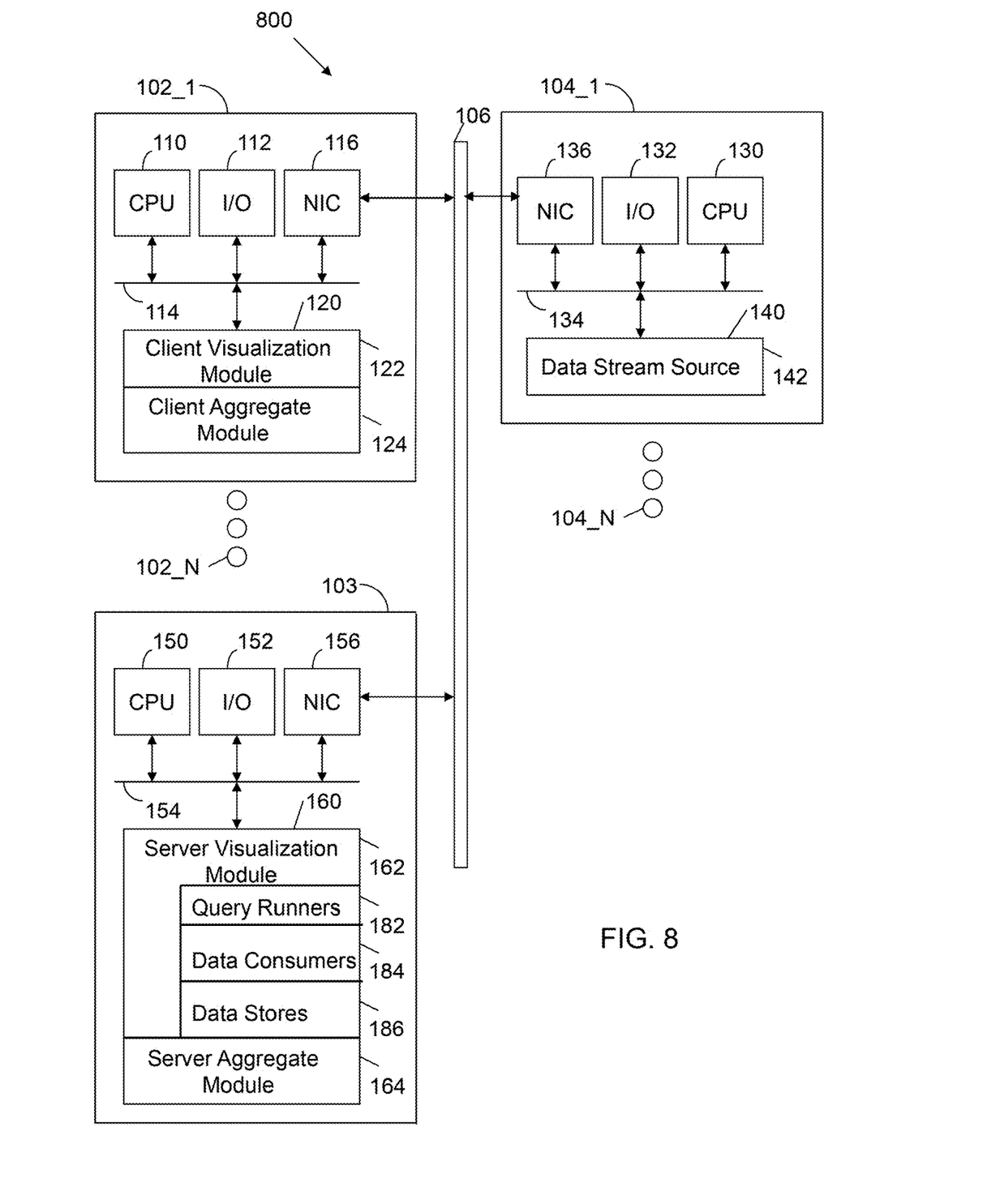
FIG. 8 illustrates a system configured in accordance with an embodiment of the invention.

For the purpose of clarity, FIG. 1 discloses the invention with a single client 102. FIG. 8 illustrates a system 800 with multiple clients 102_1 through 102_N that simultaneously receive streamed data from the visualization server 103. The server visualization module 162 has associated query runners 182, data consumers 184 and data stores 186. The server visualization module 162 creates an object when a Streaming Connection is created. In particular, client 102 sends a request to server 103 to access a given streaming server, say server 104_1. The server visualization module 162 thereafter handles the configuration parameters of which streaming engine to connect to. In one embodiment, it creates a pool of threads to handle asynchronous requests to gather data from the streaming engine 104_1 as well as to return data to the client visualization module 122.

The server visualization module 162 also tracks queries and consumers. In one embodiment, the server visualization module tracks instances of Query Runners 182 and Data Consumers 184 and deletes them when they are no longer needed. A Query Runner is a thread that runs for each distinct query that comes into the Visualization Server 103 from any visualization client 102_1 through 102_N. The visualization client is typically a web browser that consumes the results of the streaming server 103. If the underlying query coming from different visualization clients is the same, then the same Query Runner is used and a new one is not created. Only when the underlying query is different, is a different instance of a Query Runner created.

Query Runner runs the streaming query and continuously stores the streaming results into an associated Data Store 186 in memory 160. This thread continuously checks for when the associated Data Store was last checked for results. If it is over a specified time period, it untracks itself and associated Data Consumers and Data Stores from the Query and Consumer Trackers. This is done to handle the case where a user might be using a browser to view streaming data and then closes the tab/browser—the visualization server 103 at this point in time needs to detect that the client visualization module 122 is not available anymore so there is no need to continue fetching streaming data from a data stream source 142.

A Data Consumer is created to track every visualization client (different browsers, different tabs within a browser). A new instance of a Data Consumer is created even if the underlying query is being executed by a different Data Consumer.

A Data Store is created per distinct query and has a 1-1 mapping with the Query Runner. This is a cache of data that has been retrieved from the streaming engine 104 using a Query Runner. Different Data Consumers (which have the same underlying query) keep pointers to their positions within the Data Store. The Data Store keeps a timestamp of when it has last been checked for results by a client visualization module asynchronous thread. Other asynchronous threads are fired off from the client visualization modules to get the results back of a streaming query.

A visualization client gets instantiated each time a visual is created. This visual could be one out of many in a dashboard, one out of many in a dashboard sheet, which could be part of a dashboard comprising multiple sheets. A dashboard could be part of an application and multiple dashboards could be part of an application. Each visual comprises a visualization client and if they are connecting to a streaming backend then the streaming component kicks in.

Each visualization client is associated with a streaming query that it sends to the visualization server 103. When the visualization server gets this query, it looks at the existing data connection component and the Query and Consumer Tracker. If this query is already running for a different client, which is deciphered by looking up the Query Runners, then only a new Data Consumer is instantiated and not a new Query Runner. If the query is completely new, then a new Query Runner as well as a new Data Consumer are instantiated. A Data Store is also instantiated if a new Query Runner is instantiated.

The Data Consumer is specific to each visualization client and keeps track of the positions where the client should read from the Data Store. So, it is possible to have multiple visualization clients being tracked by multiple Data Consumers but all reading from the same Data Store. The different offsets of where the multiple Data Consumers are reading are stored within a Data Consumer object. For example, there may be three different clients, but two of them are running the same query. Therefore, only two Query Runners and two associated Data Stores are created. The individual Data Consumers take care of tracking which offsets are being read from by the individual clients. Each visualization client runs an asynchronous thread to constantly query the results of the streaming query as they come in, reading from the Data Store.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising;
 a bus;
 a network interface circuit to receive different data streams from a network, the network interface circuit being connected to the network and the bus;
 a processor connected to the bus; and
 a memory connected to the bus, the memory storing instructions executed by the processor to:
  continuously increment aggregate functions associated with data parameters within the different data streams,
  define a visualization priority threshold tuned depending on a type of visualization of the different data streams,
  periodically update visualizations of the different data streams on different client devices connected to the network, wherein an update occurs when the visualization priority threshold is reached, and wherein the different data streams are retrieved from different data stream servers connected to the network, and wherein the visualization priority threshold comprises one of: an amount of data of the data streams to collect, or an amount of time of data collection, and handle configuration parameters with the different data stream servers, and further wherein the visualization priority threshold is tuned to provide near continuous updates to a heat map type visualization, and non-continuous updates to a bar or line chart type visualization.

2. The machine of claim 1 further comprising instructions executed by the processor to track currently executing queries and currently active data consumers of the different data streams.

3. The machine of claim 1 further comprising instructions executed by the processor to manage requests for data from the different data stores from multiple data stores.

4. The machine of claim 1 further comprising instructions executed by the processor to manage requests for data from the different data stores from multiple consumers.

5. The machine of claim 1 wherein the aggregate functions include a sum, a count, a minimum and a maximum.

6. The machine of claim 1 further comprising instructions executed by the processor to combine aggregate functions to compute statistical measures.

7. The machine of claim 6 further comprising instructions executed by the processor to incorporate the aggregate functions and statistical measures in visualizations of the data streams.

8. A method comprising:
continuously incrementing aggregate functions associated with data parameters within the different data streams;
defining a visualization priority threshold tuned depending on a type of visualization of the different data streams, and
periodically updating visualizations of the different data streams on different client devices connected to the network, wherein an update occurs when the visualization priority threshold is reached, and wherein the different data streams are retrieved from different data stream servers connected to the network, and wherein the visualization priority threshold comprises one of: an amount of data of the data streams to collect, or an amount of time of data collection, and
handling configuration parameters with the different data stream servers, and further wherein the visualization priority threshold is tuned to provide near continuous updates to a heat map type visualization, and non-continuous updates to a bar or line chart type visualization.

9. The method of claim 8 further comprising tracking currently executing queries and currently active data consumers of the different data streams.

10. The method of claim 8 further comprising managing requests for data from the different data stores from multiple data stores.

11. The method of claim 8 further comprising managing requests for data from the different data stores from multiple consumers.

12. The method of claim 8 wherein the aggregate functions include a sum, a count, a minimum and a maximum.

13. The method of claim 8 further comprising combining aggregate functions to compute statistical measures.

14. The method of claim 13 further comprising incorporating the aggregate functions and statistical measures in visualizations of the data streams.

* * * * *